(12) United States Patent  (10) Patent No.: US 7,783,604 B1
Yueh  (45) Date of Patent: Aug. 24, 2010

(54) DATA DE-DUPLICATION AND OFFSITE SAAS BACKUP AND ARCHIVING

(75) Inventor: Jedidiah Yueh, Irvine, CA (US)

(73) Assignee: EMC Corporation, Hopkinton, MA (US)

( * ) Notice: Subject to any disclaimer, the term of this patent is extended or adjusted under 35 U.S.C. 154(b) by 366 days.

(21) Appl. No.: 11/968,050

(22) Filed: Dec. 31, 2007

(51) Int. Cl.
*G06F 17/30* (2006.01)

(52) U.S. Cl. ..................................... 707/640

(58) Field of Classification Search .................. 707/10, 707/200, 640; 709/201
See application file for complete search history.

(56) References Cited

U.S. PATENT DOCUMENTS

| | | | |
|---|---|---|---|
| 6,810,398 B2 * | 10/2004 | Moulton | 707/6 |
| 7,647,327 B2 * | 1/2010 | Aguren | 1/1 |
| 2002/0103889 A1 * | 8/2002 | Markson et al. | 709/223 |
| 2002/0152181 A1 * | 10/2002 | Kanai et al. | 705/80 |
| 2003/0154238 A1 * | 8/2003 | Murphy et al. | 709/201 |
| 2005/0240800 A1 * | 10/2005 | Hashimoto | 714/4 |
| 2007/0233949 A1 * | 10/2007 | Hart | 711/114 |
| 2008/0140802 A1 * | 6/2008 | Levy et al. | 709/217 |

* cited by examiner

*Primary Examiner*—Etienne P LeRoux
(74) *Attorney, Agent, or Firm*—Workman Nydegger

(57) ABSTRACT

A data protection and management solution includes a storage application operated in a tenant computer system and a data protection application hosted in a host computer system as a SaaS application. The storage application generates storage efficient backups of a raw data set stored on the tenant computer system and replicates the backups to the SaaS application. The SaaS application stores the backups and provides one or more data protection and management services, such as offsite backup, offsite archiving, and information lifecycle management, to the tenant computer system. In the event of loss or corruption of all or a portion of the raw data set on the tenant computer system, a recovery module of the storage application can be used to generate a recovered version on the tenant computer system of the raw data set based on the backups replicated to the SaaS application.

20 Claims, 3 Drawing Sheets

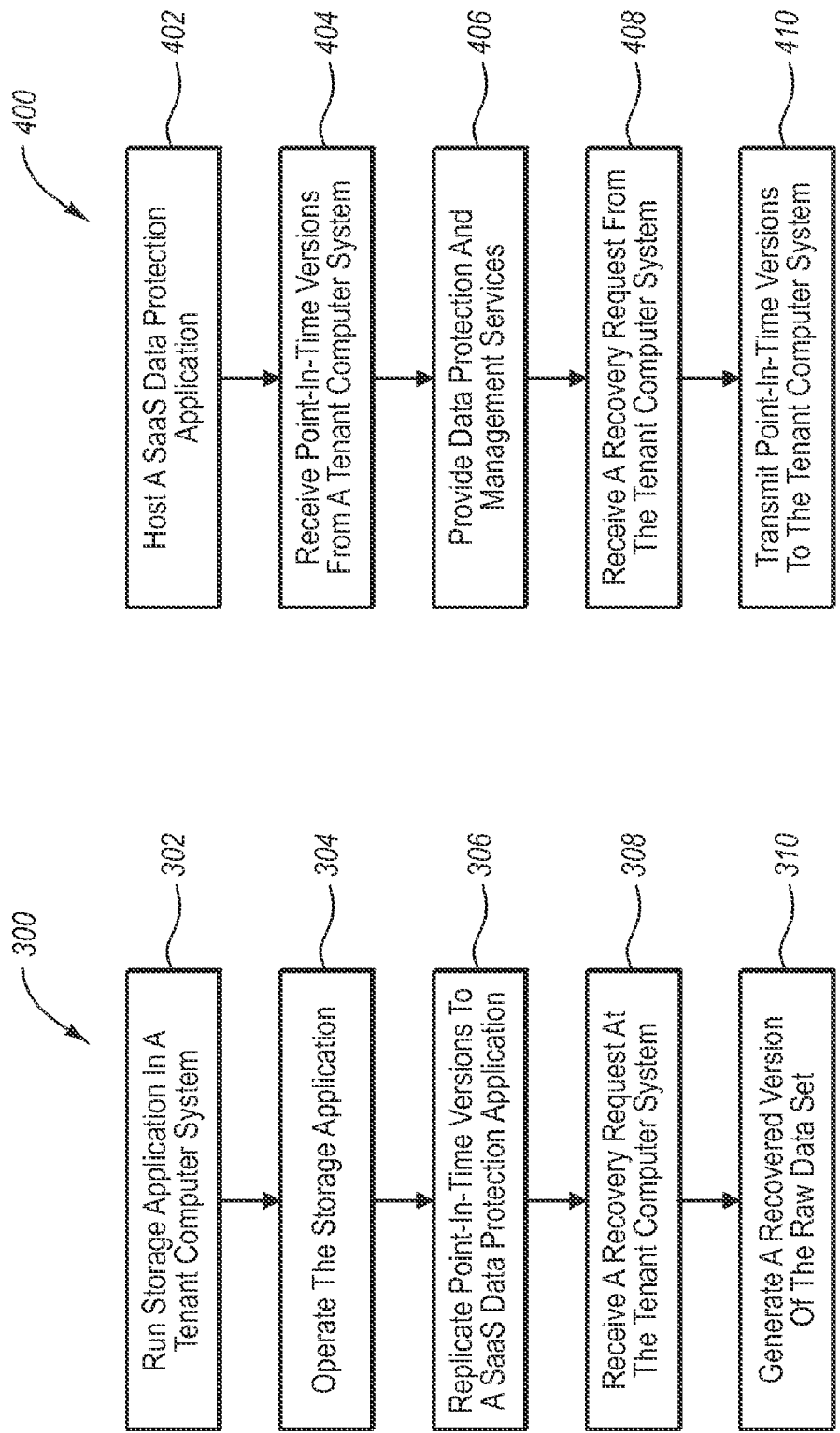

DATA DE-DUPLICATION AND OFFSITE SAAS BACKUP AND ARCHIVING

CROSS-REFERENCE TO RELATED APPLICATIONS

Not Applicable.

BACKGROUND OF THE INVENTION

1. The Field of the Invention

The present invention relates to data storage and back-up solutions for archiving data and recovering data. More particularly, embodiments of the invention relate to software, hardware, systems, and methods for providing data protection and management using a high efficiency storage solution paired with an offsite data protection application implemented as a hosted SaaS application.

2. The Relevant Technology

The need for reliable backup and archiving of information is well known. Businesses are devoting large amounts of time and money toward information system ("IS") resources that are devoted to providing backup and archive of information resident in computers and servers within their organizations that produce and rely upon digital information. The customers of the data storage industry are more frequently demanding that not only is their data properly backed up but also that when needed, such as after a system failure that causes a loss of data, that the backed up data be accessible at a particular point in time. In other words, there is an increasing demand for almost continuous data protection that allows data to be restored back to its state at a particular moment in time, which is most commonly a point in time just before their computer or data storage system crashed or was lost. Customers desiring point-in-time data protection, though, must weigh their need for point-in-time data protection against the costs of a given solution. And typically, data protection solutions represent a significant cost to a customer in terms of the software, hardware, and IT personnel required to provide and support the solution.

For instance, a typical data protection solution requires a significant initial investment in a software license and corresponding hardware on which the licensed software can run. A customer may also need to purchase/lease one or more storage and/or archive devices. Ongoing costs in terms of software license renewals and IT personnel to configure and maintain the software and hardware (including the storage/archive devices) can quickly add up. Installation of software patches and upgrades can result in system downtime and can prevent IT personnel from attending to a customer's other IT needs. In short, a conventional data protection solution may be ill-suited for SMBs, startups, and individual end-users lacking the financial and IT resources required to support such a solution.

As a result, existing data protection solutions do not meet the needs of many data storage customers, and there is a continuing need for enhanced techniques for providing continuous or near continuous data protection.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 3 depicts one embodiment of a method for providing data protection using a paired storage application and SaaS application according to the invention; and FIG. 4 depicts another embodiment of a method for providing data protection using a paired storage application and SaaS application according to the invention.

DETAILED DESCRIPTION OF THE PREFERRED EMBODIMENTS

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

The present invention is directed to methods and systems for providing data protection (e.g., archiving and backup of data) using a high efficiency storage application ("HESA") paired with a software as a service ("SaaS") replication target. Briefly, embodiments of the invention include a HESA configured to generate and store multiple point-in-time versions of a data set N, i.e., N, N1, N2, N3, etc., in less space than the sum of the sizes of the datasets, i.e., the sum of the sizes of N+N1+N2+N3. The point-in-time versions, and optionally the HESA itself, can be replicated over a network to an online replication target implemented as a SaaS application. In the event of data loss, the replicated point-in-time versions can be recovered from the SaaS application back into the HESA using a recovery module of the HESA. Alternately or additionally, where the entire HESA has been replicated to the replication target, the HESA can be ported onto any hardware system that supports the HESA To practice the invention, the computer and network devices may be any devices useful for providing the described functions, including well-known data processing and storage and communication devices and systems such as computer devices typically used as hosts in user systems with processing, memory, and input/output components, and server devices configured to maintain and then transmit digital data over a communications network. Data typically is communicated in digital format following standard communication and transfer protocols. The data storage resources are generally described as disk, optical, and tape devices that implement RAID and other storage techniques and that may use SCSI and other I/O, data transfer, and storage protocols, but the invention is not intended to be limited to the exemplary embodiments or to specific hardware and storage mechanisms as it is useful for nearly any data storage arrangement in which archives of digital data, such as data volumes, are generated and maintained.

Figure 1:
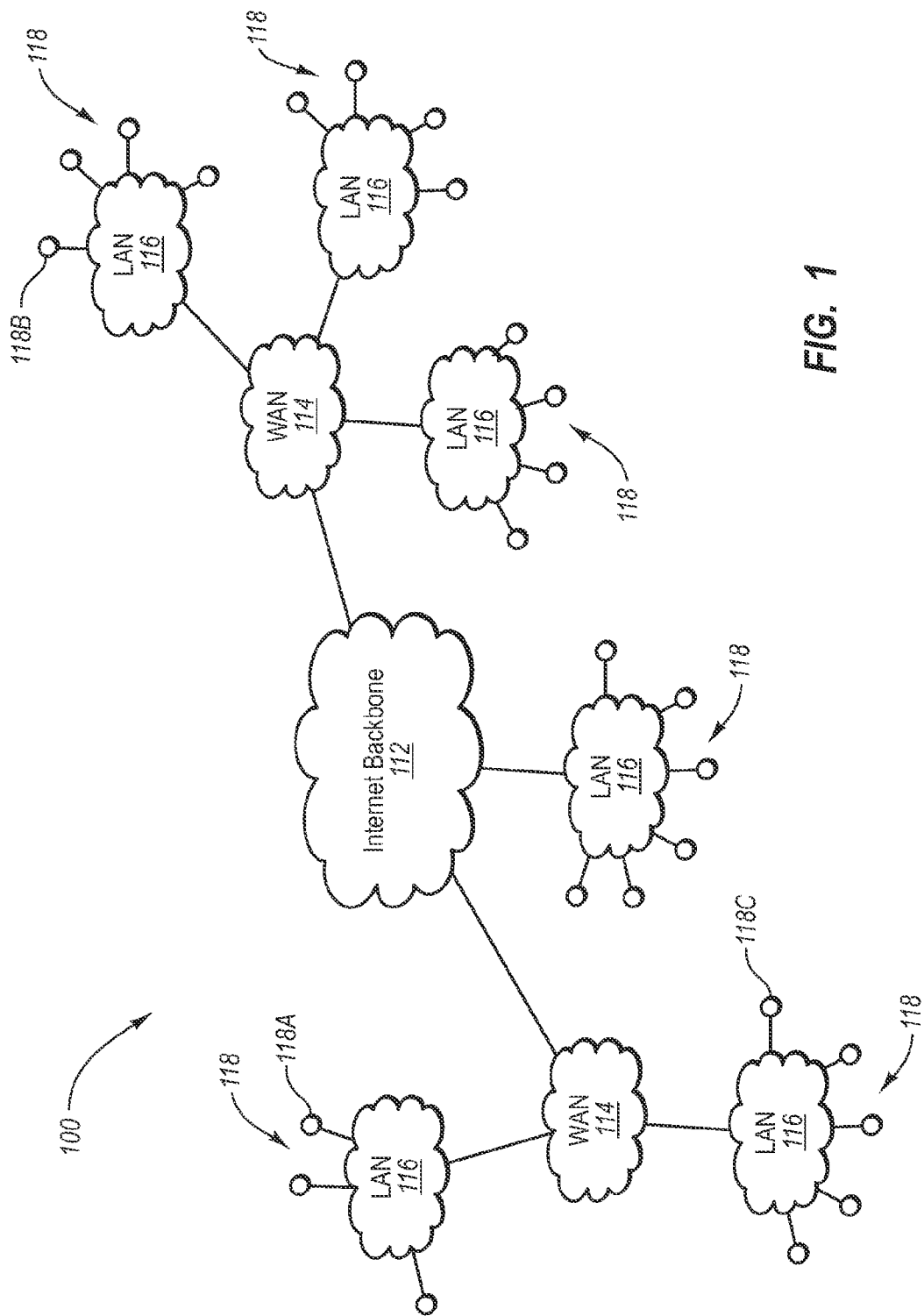
FIG. 1 is a high level illustration of a representative networked computer environment in which the systems and methods of the invention may be implemented.

With reference now to FIG. 1, an example operating environment 100 is described in which embodiments of the invention can be implemented. As illustrated, the environment 100 is a network which may include the Internet or other internetwork formed by logical and physical connections between multiple wide area networks ("WANs") 114 and local area networks ("LANs") 116. An Internet backbone 112 represents the main lines and routers that carry the bulk of the data traffic. The backbone 112 is formed by the largest networks in the system that are operated by major Internet service providers ("ISPs") such as Verizon, Sprint Nextel, AT&T, and America Online, for example. While single connection lines are used to conveniently illustrate WAN 114 and LAN 116 connections to the Internet backbone 112 and between each other, it should be understood that in reality, multi-path, routable physical connections exist between WANs 114 and LANs 116. This makes the network 100 robust when faced with single or multiple failure points.

The network 100 further comprises a system of general purpose, usually switched, physical connections that enable logical connections between processes operating on nodes 118. The nodes may comprise, for instance, client nodes, storage nodes, server nodes, and the like or any combination thereof. In embodiments of the invention described below, one or more client nodes, such as client nodes 118A and 118B, operate high efficiency storage applications to generate one or more point-in-time versions of a data set (also referred to as "backups"). The client nodes 118A, 118B can then replicate the one or more backups over the network 100 to a server node, such as the node 118C, that hosts a SaaS data protection application. Besides acting as a replication target, the SaaS data protection application may provide one or more data protection and management services.

Figure 2:
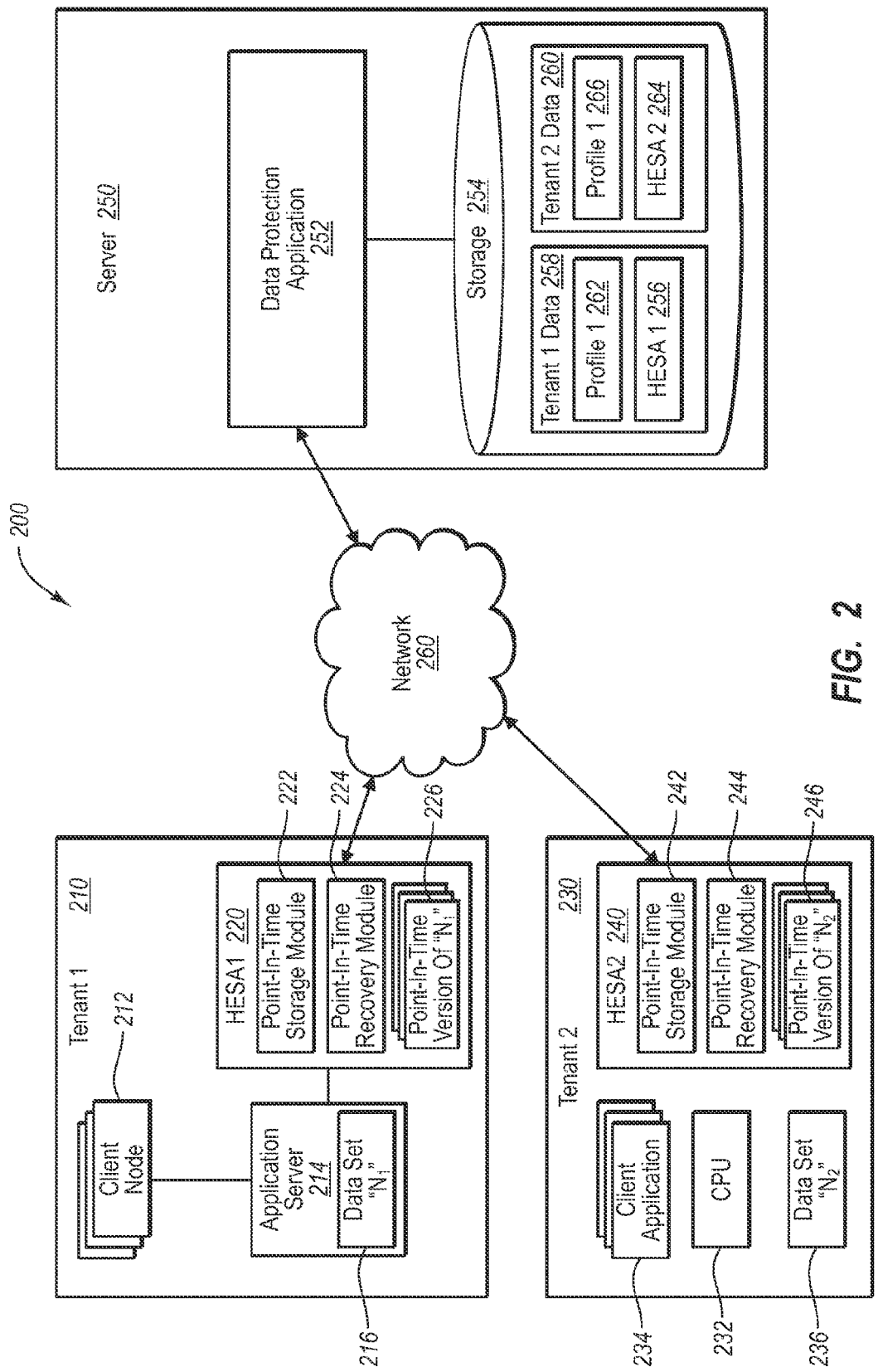
FIG. 2 is a more detailed diagram of a possible operating environment for utilization of the systems and methods of the invention.

With additional reference to FIG. 2, a system 200 is illustrated in simplified block form with example HESA and SaaS data protection applications according to embodiments of the invention. The system 200 includes one or more tenant systems, illustrated in FIG. 2 as a first tenant 210 and a second tenant 230. The tenants 210, 230 may correspond to the client nodes 118A, 118B of FIG. 1. The tenants 210, 230 communicate over a network 260, which may correspond to the network 100 of FIG. 1, with a data protection application 252 hosted by server or host system 250, which may correspond to the server node 118C of FIG. 1. The system 200 is shown in simplified or example form and is intended to represent a distributed network of computer systems/devices that generate digital data that is protected with copies stored by the data protection application 252.

As shown, the first tenant 210 comprises a client computer system (such as a networked enterprise system, a data center, or the like) in which a plurality of client nodes 212 (such as desktops, laptops, portable computing devices, and/or other computer workstations) are running one or more applications. The client nodes 212 generate data (such as files associated with the applications running on the client nodes) that is shown to be stored in application server 214 as data set 216.

In the client computer system 210 a high efficiency storage application ("HESA") 220 is provided that is generally any software-based or implemented technique for processing data, i.e., raw data sets, and to create data sets of reduced size for storage or backups. The HESA 220 includes a point-in-time storage function or module 222 that is used to generate compressed or otherwise more storage efficient versions for data sets, such as point-in-time versions of data sets 226 that are significantly smaller in size than the original set 216 being backed up or copied. Also, the HESA 220 includes a data recovery methodology or module 224 that allows a set of point-in-time data sets to be restored or recovered after they have been stored in an efficient manner using the HESA 220 (more particularly, using the module 222, or the like). For instance, the HESA 220, in the point-in-time storage module 222 or other modules not shown, may employ one or more of the following technologies: snapshots, file differencing techniques, content addressed storage systems, continuous data protection, and generally any system that eliminates redundant data components that may be fixed or variable in size.

According to one embodiment of the invention, HESA 220 implements commonality factoring technology to generate storage efficient versions for data sets. Embodiments of commonality factoring technology methods and systems are described in more detail in U.S. Pat. No. 6,810,398, which is herein incorporated by reference. Briefly, commonality factoring is a data de-duplication method that involves breaking a data set into pieces based on commonality with other pieces in the system or the likelihood of pieces being found to be in common in the future. A hash function is performed on each piece to generate and assign a probabilistically unique number (referred to herein as a "hash" or "hash value") to each piece of data. The hash value for each piece of data is compared to a table of hash values corresponding to data already stored in the system and new hash values are added to the hash table and corresponding new pieces of data are stored in the system. If a hash value is identical to a pre-existing hash value in the system, the corresponding redundant piece of data is not stored again and instead a pointer is used instead of the redundant instance of the piece of data, the pointer pointing to a single instance of the piece of data.

As shown, the HESA 220 functions to process the data set 216 to generate high efficiency point-in-time versions of N 226. The processed data 226 may take numerous forms to practice the invention but preferably is stored in a manner that is reduced in size relative to the number of versions stored (e.g., the stored data 226 is not simply the size of the data set N 216 multiplied by the number of versions but instead is some smaller size as the point-in-time versions 226 are typically smaller or more efficient versions), with the size and form of the versions 226 varying with the particular implementation of the HESA 220.

The HESA 220 communicates over network 260 with data protection application 252 to replicate point-in-time versions 226 from the first tenant 210 to the data protection application 252. Alternately or additionally, the entire HESA 220 (including storage module 222, recovery module 224, and point-in-time versions 226) can be replicated to the data protection application 252. Advantageously, the point-in-time versions can be communicated across the network 260 using a relatively small amount of bandwidth since they are high efficiency point-in-time versions. The data protection application 252 stores the replicated data and/or replicated HESA 256 in storage 254, which may comprise, for instance, disk-based storage.

The data protection application 252 is a software application that is delivered to the tenants 210, 230 as a service. In other words, the data protection application 252 is a SaaS application. The SaaS data protection application 252 is hosted and operated on the server 250 by a vendor or other third party. The SaaS data protection application 252 may be a web-native application that leverages web technologies, such as web browsers, commonly implemented by client nodes to provide access to the application 252 to end users at the client nodes. Alternately or additionally, a SaaS client application can be installed at the tenants 210, 230 and used to access the SaaS data protection application 252. For instance, end users at tenant 210 may access the data protection application 252 via a web browser and/or a client application (such as HESA 220).

The SaaS data protection application 252 functions to provide offsite data protection and management for the tenants 210, 230. For instance, the SaaS application 252 may simply provide a remote replication target for the HESA 220. Alternately or additionally, the data protection application 252 may provide information lifecycle management ("ILM") for data replicated from the HESA 220. Thus, the application 252 may remove and delete backups (e.g., point-in-time versions) and/or individual files from the storage 254 depending on factors such as age, scope (e.g., full backup vs. partial backup), content, and the like or any combination thereof. Alternately or additionally, backups and/or individual files can be migrated by the SaaS application 252 from storage 254 to an archive (not shown) or other storage device accessible to the SaaS application 252, based on one or more of the aforementioned factors. Alternately or additionally, the SaaS application 252 can provide one or more of: metadata and/or full text search for regulatory compliance or discovery; data archiving or freeing data storage by removing data on primary storage and leaving stubs that point to data that is stored at the SaaS repository; data classification and/or management; and the like or any combination thereof.

Whereas the SaaS application 252 provides data protection and management services for a plurality of tenants, storage 254 can be partitioned (e.g., virtualized) to maintain the data associated with each tenant separate. Accordingly, data 258 associated with the first tenant is maintained separate from data 260 associated with the second tenant. The virtual partitioning of storage 254 is designed to prevent data leakover and prevent compromising the security of the tenants' data.

As shown, the data 258 associated with the first tenant includes the replicated HESA 256 (and/or backups), as well as profile and configuration data 262. The profile and configuration data 262 enables customization of the SaaS application 252 for each tenant. Thus, an administrator or other user of the first tenant system 210 can configure the SaaS application 252 as desired by, e.g., selecting a specific data protection and management service, a particular service level that can include one or more services, and so on. The administrator may also configure the look and feel of the application when accessed through tenant system 210, and so on. The administrator's selections and other configuration information are stored in the profile and configuration data 262 and are used by the SaaS application 252 at runtime to operate as desired.

Although not shown, the SaaS application 252 may include a billing module. The billing module may monitor, and record in the profile and configuration data 262 or elsewhere, usage by the tenant 210 in order to bill the tenant for the usage of the SaaS application. Various models are contemplated by the invention. For instance, the billing module may monitor and record SaaS application usage on a per-use basis, a periodic basis (e.g., monthly), a data amount received/stored basis, and the like or any combination thereof. Usage data can then be reported to an external billing system in order to bill the customer associated with the tenant system 210. Alternately or additionally, the vendor or third party that owns/operates the SaaS application 252 can provide its data protection and management services free of charge (e.g., during a free trial period) or may even pay the customer in some circumstances.

The pairing of the high efficiency storage application 220 with the SaaS application 252 provides many benefits and advantages. First, especially for small businesses, startups, and individual users, the initial cost of obtaining data protection and management services using the SaaS application will be far less then obtaining the same amount and level of service with a privately owned data protection and management solution. For instance, the initial cost of the SaaS application may be limited to a relatively small fee for licensing or otherwise purchasing the HESA 220, while the initial cost of the privately owned solution may be a relatively large licensing fee. Additionally, the HESA 220 can be run on existing hardware of the tenant system 210 while a privately owned solution may require a specialized host system, further increasing the initial cost if the specialized host system must be purchased. Further, the SaaS model can eliminate IT headcount in the tenant system 210 since the data protection application 252 and server 250 are maintained by the vendor or third party that owns/operates the data protection application.

The system 200 may additionally include the second tenant system 230, which may correspond to the client nodes 118A, 118B of FIG. 1. As illustrated, the second tenant 230 comprises a standalone or remote client node 230 that is linked to the network 260 and includes a CPU 232 running applications 234. The applications 234 use and/or create client data 236 that is stored locally on the tenant 230. A second high efficiency storage application 240 functions similar to the HESA 220 in tenant system 210 to create point-in-time versions 246 of the data set 236. The HESA 240 can then replicate the backups 246, and optionally the entire HESA 240, through the network to the data protection application 252 where it is stored as replicated HESA (or backups) 264 in the second tenant data 260, along with profile and configuration data 266 for the second tenant. The SaaS application 252 can then perform data protection and management services for the replicated data 264, as described above with respect to the replicated data 256 of the first tenant.

Alternately or additionally, the system 200 may include a third tenant system with a de-duplication application (e.g., a de-duplication client) instead of a HESA. In this case, the de-duplication application would provide functionality similar to that of the point-in-time storage modules 222 and 242, de-duplicating redundant data from a stored data set and sending de-duplicated data sets to the server 250.

According to one embodiment of the invention, either or both of the HESAs 220, 240 may be user-configurable. For instance, an administrator or other user may configure the HESA 220, 240 to generate backups 226, 246 of data set 216, 236 automatically, on a specific schedule and/or with a particular frequency (e.g., continuously, hourly, weekly, monthly), and the like or any combination thereof. Alternately or additionally, the HESA 220, 240 may be configured to generate partial backups (e.g., for one or more subsets of the data set 216, 236). Alternately or additionally, the HESA 220 may be configured to replicate to the SaaS data protection application 252 automatically, on a schedule, and/or with a particular frequency, and the like.

The data 256, 264 replicated to the SaaS application 252 can be used to recover or restore the data sets 216, 236 to a particular point in time. Recovery modules 224, 244 of each HESA 220, 240 may be used to respond to a host/client request to recover or restore the data sets 216, 236 (or to otherwise recover from a loss of data, a data corruption, or the like). To this end, the system 200 is adapted such that the HESAs 220, 240 can port to the SaaS data protection application 252 to access the backups stored in storage 254 so as to recover the data on the tenant systems 210, 230. Such a recovery is performed using the data recovery tool or module 224, 244 of the HESA 220, 240 and can be performed on any hardware system that supports the HESAs 220, 240.

In embodiments of the invention, either or both of the HESAs 220, 240 may be implemented as a conventional system (e.g., as an application running on an operating system within the tenant systems 210, 230) or as a virtual system (e.g., as an application running on a virtualization layer within the tenant systems 210, 230). In the latter case, the HESA 220, 240 uses a virtualization layer to shield the HESA from the actual hardware upon which the HESA is operated. The virtualized HESA can then be replicated to the SaaS application 252 and later ported onto a new hardware subsystem where the stored data sets can be recovered according to the recovery methodology of the original HESA. The use of the virtualization layer allows a HESA to be restored to a hardware subsystem having different physical characteristics than those of the environment in which the HESA was originally implemented With reference additionally now to FIG. 3, a method 300 is illustrated for providing data protection from the point of view of a tenant computer system. A typical tenant computer system in which the method 300 may be implemented includes a storage device storing a raw data set. For instance, the method 300 may be practiced in the tenant computer systems 210, 230 of FIG. 2. The process 300 begins by running 302 a high efficiency storage application on the tenant computer system. In particular, the storage application can be run on a software platform, such as a virtualization layer or an operating system, provided on the tenant computer system. As mentioned above, a virtualization layer provides a layer of abstraction between the components of the tenant computer system and the storage application, presenting a representation of a set of standardized hardware based on the components to the storage application. An operating system provides device support and physical resource management of the components for the storage application.

One purpose of the storage application is to generate point-in-time versions of the raw data set in the event the raw data set is lost, corrupted, or otherwise damaged. Thus, the storage application is operated 304, as already described above, to generate and store versions of the raw data set. Typically, the versions are efficient versions that are reduced in size relative to the raw data set.

The point-in-time versions of the raw data set, and optionally the storage application itself, are replicated 306 to the SaaS data protection application by the storage application. The SaaS data protection application is hosted in a host system, such as server 250 of FIG. 2, that includes a storage device for storing the replicated versions of the raw data set. As described above, the SaaS application and host system are typically administered and/or owned by a different entity than administers and/or owns the tenant computer system and storage application, thereby enabling one or more of the advantages of SaaS. However, the SaaS application and storage application are specifically designed to operate as a paired solution. In one embodiment, the storage application is even purchased and/or licensed from the same entity that administers and/or owns the SaaS application.

Returning to FIG. 3, the storage application on the tenant computer system may optionally receive 308 a recovery request after all or a portion of the raw data set stored on the tenant computer system is lost, corrupted, or otherwise damaged. Finally, the storage application can optionally use its point-in-time recovery module to generate 310 a recovered version of the raw data set on the tenant computer system. Step 310 may include, for instance, requesting all or a portion of the data sets previously replicated by the storage application to the data protection application.

With additional reference to FIG. 4, a method 400 is illustrated for providing data protection from the point of view of a SaaS data protection application. A typical SaaS data protection application in which the method 400 may be implemented is designed to operate as a paired solution with a plurality of storage applications, each of which can operate on a different tenant computer system. Furthermore, the host system and data protection application are typically administered and/or owned by a different entity than administers and/or owns any given tenant computer system and storage application.

The process 400 begins by hosting 402 the data protection application on the host computer system as a SaaS application. The data protection application receives 404 point-in-time versions of a raw data set from a storage application running in a tenant computer system. The point-in-time versions of the raw data set are efficient versions that are reduced in size relative to the raw data set.

The process 400 continues by providing 406 data protection and management services to the tenant computer system. The data protection and management services that may be provided include, for example, offsite backup services, offsite archiving services, information lifecycle management services, and the like or any combination thereof. Thus, providing data protection and management services may comprise storing the point-in-time versions of the raw data set in one or more storage devices of the host computer system. In one embodiment, the one or more storage devices are partitioned into virtual storage devices corresponding to the different tenant computer systems that the data protection application communicates with. In this manner, data associated with a given tenant computer system can be stored separately from the data associated with the other tenant computer systems.

After the loss or corruption of data at a tenant computer system, or for any other reason, the SaaS data protection application may optionally receive 408 a recovery request from a storage application of the tenant computer system. In response, the SaaS data protection application may optionally transmit 410 one or more point-in-time versions of the raw data set to the storage application. The storage application can then generate a recovered version on the tenant computer system of the raw data set based on the one or more point-in-time versions of the raw data set that it receives from the SaaS application.

As described above, the data protection application and storage application are designed to operate as a paired solution. Advantageously, this allows a first entity to obtain data protection and management services while avoiding the cost of a conventional system (e.g., costs associated with a host system, server software, disk storage, archive storage, IT headcount, etc.) by purchasing and/or licensing a storage application designed to run in a computer system associated with the first entity. A second entity that administers and/or owns the SaaS data protection application and the host system can then provide the first entity with data protection and management services, charging the first entity fees for data protection and management services according to a pay-as-you-go or other model. This eliminates the need for the first entity to purchase and maintain the backup solution with its associated software and hardware, transferring these responsibilities to a second entity that administers and/or owns the SaaS application and host system.

As mentioned above, the storage application may be implemented on a virtualization layer or infrastructure. The virtualization layer or infrastructure may take a number of forms to practice the invention. In one embodiment, however, the high efficiency storage application is run on VMware virtualization products such as VMware ESX or GSX (or similar products). Virtualization products such as VMware ESX are relatively well known and understood by those skilled in the art and a full discussion is not believed required here to describe the invention. In other embodiments, the virtualization layer is provided by the virtualization product Xen 3.0 (or other versions) from XenSource, and in other embodiments, virtualization products from Microsoft Corporation and/or Intel Corporation are used to provide the virtualization layer described herein.

The high efficiency storage applications illustrated in FIG. 2 and described herein may vary to practice the invention. In one example, embodiments of the high efficiency storage and data recovery methodologies implemented in this software suite are described in U.S. Pat. No. 6,810,398, incorporated herein by reference.

Additionally, the following description is an overview of technology that may be used as part of a high efficiency storage application of the invention. Enterprise data protection is designed to more effectively address the challenge of data backup and recovery. Embodiments of the invention solve the challenge of data compression and redundancy of backup data at the source, using commonality factoring technology, which reduces or even eliminates redundant data. HESAs, in one example, can be de-duplication applications that identify and filter repeated data sequences stored in files within a single system, across systems, and over time at each client so that each unique data sequence is only backed up once within the enterprise, greatly reducing the overall data that must be transmitted over the network and stored within the system or network or by the SaaS. As a result of this approach, copied or edited files, shared applications, embedded attachments, and even a daily changing database only generate a small amount of incremental storage for system as described herein.

The commonality factoring technique allows a changed file to efficiently be analyzed and split into variable sized blocks averaging 12 KB in size, which are then assigned a 20-byte content address based on the contents of the information. A determination is then made as to whether that information has already been stored within the system (e.g., has already been backed up on this system or another system at some point in the past) and if so, does not backup the data again but stores only the content address pointing to the existing information. By performing this analysis at the client, embodiments of the invention effectively delivers a 600-1 reduction (20 bytes sent to represent a 12 KB block of data) for data that is already stored within the system or network, and on average provides greater than 100-1 reduction in backup data when performing daily full backups.

As this description of the invention implies, it is useful in understanding how to act to find changed files and then break these files into blocks or atomics, e.g., how to select breakpoints in data sequences to better determine what has been changed and requires backup. This technique may be described as follows: One of the key factors for performing reduction of redundant data at a sub-file level is a method to effectively determine common sequences of data when analyzing large volumes of data. Most techniques for assessing sub-file level changes utilize a simplistic method for analyzing files using fixed block boundaries, which are typically 512 bytes in size. These techniques, however, perform poorly under many circumstances. If a slight change is introduced at the beginning of a file or document, the contents of the entire file get shifted resulting in a fixed block size analysis detecting the entire file as being modified. Commonality or "sticky byte" factoring technology addresses the weaknesses of fixed block delta analysis such that common elements may be found on multiple related and unrelated computer systems without the need for communication between the computers and without regard to the data content of the files. This method determines logical or "sticky byte" breakpoints within data sequences to efficiently and effectively divide a data set into pieces that yields optimal commonality. If a document or file is edited such that new information is placed at the beginning of the file and existing data is deleted from the middle of the file, the "sticky byte" factoring of the file performed by the HESA ensures that only a small percentage of the total file is actually detected as having been modified. This technique is also extremely effective when performing delta analysis of large database dump files, resulting in only a small percentage of the total data being detected as modified (and subsequently backed up over the network) despite changes in tables throughout the database.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for providing data protection, comprising:
running a storage application on a software platform provided on a tenant computer system comprising a storage device storing a raw data set;
operating the storage application to generate a plurality of versions of the raw data set, wherein the raw data set has a size and wherein a size of the plurality of versions of the raw data set is less than the size of the raw data set multiplied by the number of versions; and
replicating the plurality of versions of the raw data set over a network to a data protection application operated on a host computer system, wherein the tenant computer system and the host computer system are owned, operated, or both, by different entities and wherein the data protection application is configured to operate in conjunction with the storage application and wherein the data protection application is paired to the storage application and is configured to port the storage application to another hardware system.

2. The method of claim 1, wherein the plurality of versions of the raw data set replicated to the data protection application are stored in a storage device of the host computer system.

3. The method of claim 2, further comprising, using a recovery module of the storage application to generate a recovered version on the tenant computer system of the raw data set based on the plurality of versions of the raw data set stored in the storage device of the host computer system.

4. The method of claim 3, further comprising, prior to using a recovery module of the storage application to generate a recovered version of the raw data set, receiving a recovery request from a user of the tenant computer system.

5. The method of claim 4, wherein the recovery request is received from the user after all or a portion of the raw data set is lost, corrupted, or both.

6. The method of claim 1, wherein the software platform comprises one or more of:
a virtualization layer, the virtualization layer presenting a representation of a set of hardware based on components of the tenant computer system to the storage application; and
an operating system, the operating system providing device support and physical resource management of components of the tenant computer system for the storage application.

7. The method of claim 1, wherein generating a plurality of versions of the raw data set comprises employing one or more of snapshots, file differencing techniques, content addressed storage systems, continuous data protection systems, and commonality factoring.

8. A method for providing data protection, comprising:
hosting a data protection application on a host computer system as a software as a service ("SaaS") application, the data protection application being configured to operate in conjunction with a plurality of storage applications running on different tenant computer systems, wherein the tenant computer systems and the host computer system are administered by different entities;
receiving, from a first tenant computer system, a plurality of versions of a raw data set generated by a first storage application, wherein a size of the plurality of versions of a raw data set is less than a size of the raw data set multiplied by the number of versions; and
providing one or more data protection and management services to the first tenant computer system, the SaaS paired to each of the plurality of storage applications.

9. The method of claim 8, wherein providing one or more data protection and management services for the first tenant computer system comprises storing the plurality of versions of the raw data set in a storage device of the host computer system.

10. The method of claim 9, wherein the storage device of the host computer system is partitioned into a plurality of virtual storage devices corresponding to the different tenant computer systems such that data from each of the different tenant computer systems can be stored separately.

11. The method of claim 8, wherein the one or more data protection and management services comprise one or more of offsite backup, offsite archiving, and information lifecycle management.

12. The method of claim 8, further comprising receiving a recovery request from the first storage application.

13. The method of claim 12, further comprising, in response to receiving the recovery request, transmitting one or more of the plurality of versions of the raw data set to the first storage application, where the first storage application generates a recovered version on the first tenant computer system of the raw data set based on the transmitted one or more of the plurality of versions of the raw data set.

14. The method of claim 8, wherein an administrator or other user of the first tenant computer system can select the one or more data protection and management services provided to the first tenant computer system.

15. A system for providing data protection and management, comprising:
a storage application capable of running on a software platform provided on a tenant computer system, the tenant computer system comprising a storage device storing a raw data set, wherein:
the storage application can generate storage efficient versions of the raw data set, the storage efficient versions including point-in-time versions of the raw data set that are smaller in size than the raw data set; and
the storage application can replicate the storage efficient versions of the raw data set to a replication target; and
a data protection application hosted on a host computer system and configured to function as the replication target, wherein:
the host computer system and the tenant computer system are administered by different entities; and
the data protection application provides one or more data protection and management services for the tenant computer system and is configured to port the storage application to a different hardware system configured differently from the tenant computer system.

16. The system of claim 15, wherein the storage application is purchased or licensed from a first entity by a second entity associated with the tenant computer system.

17. The system of claim 16, wherein the data protection application can be configured by the second entity to provide the one or more data protection and management services.

18. The system of claim 17, wherein the first entity is associated with the data protection application and wherein the second entity pays the first entity a fee for the data protection and management services provided for the tenant computer system.

19. The system of claim 15, wherein the storage application comprises a data de-duplication application that performs the following acts when generating a storage efficient version of the raw data set:
   an act of breaking the raw data set into a plurality of blocks;
   for each block, an act of comparing the block to blocks of data previously stored in the tenant computer system; and
   if the block is identical to a previously stored block, an act of storing a pointer that points to the previously stored block; or
   if the block is not identical to any of the previously stored blocks, an act of storing the block.

20. The system of claim 19, wherein the act of comparing the block to blocks of data previously stored in the tenant computer system comprises performing a hash function on the block and comparing a resulting hash value to a table of hash values, each hash value in the table of hash values corresponding to a different one of the previously stored blocks.

\* \* \* \* \*